Oct. 8, 1963    E. H. SHARP    3,106,077
UNIVERSAL JOINT
Filed March 6, 1961    3 Sheets-Sheet 1

INVENTOR.
EVERETT H. SHARP
BY Walter E. Pavlick
ATTORNEY

*INVENTOR.*
EVERETT H. SHARP
BY Walter E. Pawlick
ATTORNEY

Oct. 8, 1963    E. H. SHARP    3,106,077
UNIVERSAL JOINT
Filed March 6, 1961    3 Sheets-Sheet 3
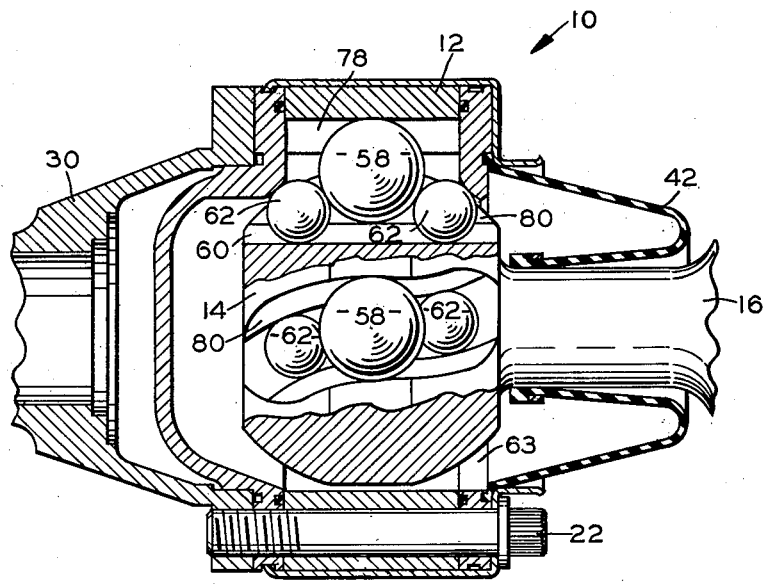
FIG. 7
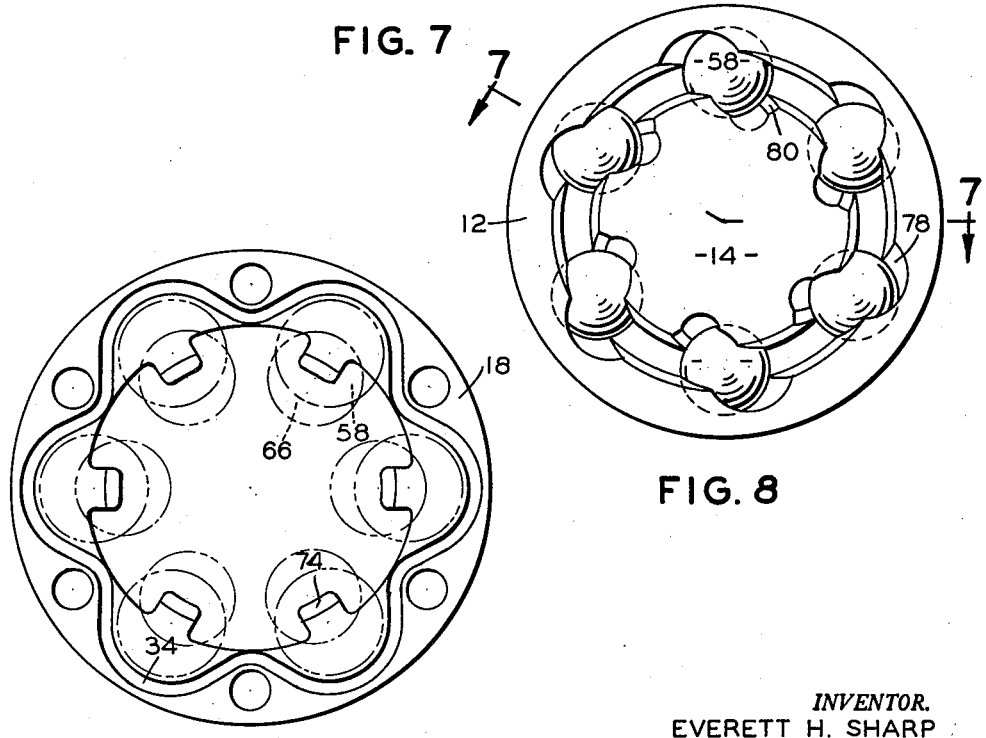
FIG. 6
FIG. 8
*INVENTOR.*
EVERETT H. SHARP
BY Walter E. Pavlick
ATTORNEY

United States Patent Office 3,106,077
Patented Oct. 8, 1963

3,106,077
UNIVERSAL JOINT
Everett H. Sharp, Lambertville, Mich., assignor to Dana Corporation, Toledo, Ohio, a corporation of Virginia
Filed Mar. 6, 1961, Ser. No. 93,734
21 Claims. (Cl. 64—21)

This invention relates to universal joints in general and more specifically to constant velocity universal joints of the ball type in which the torque transferring members are relatively movable in an axial direction.

It is a recognized fact that cross pin type universal joints, which were originated early in the art, when operating at an angle will distort the steady uniform rotation of the driving shaft to an irregular jerky rotary motion of the driven shaft. This distortion is not due to mechanical imperfection, but is due to the faulty mechanical principle of this type of joint.

The greater angles of operation and speeds of rotation of present day joint applications have resulted in increased demands for workable and inexpensive constant velocity joints to overcome this irregular rotation. Constant velocity universal joints in themselves are old in the art and were primarily evolved to overcome the deficiencies in the performance of the cross pin type joint. It is well known to those skilled in the art that in order to provide a constant rotational velocity between rotating members disposed at an angle to one another, it is sufficient to provide an intermediate revoluble member between the driving and driven members bisecting the angle between the axes of these members.

In my co-pending application Serial No. 825,149 filed July 6, 1959 (issued as Patent Number 3,017,756), a ball type constant velocity joint has been described which provides a plurality of balls adapted to be held in the plane which bisects the angle between the driving and driven members and transmits torque therebetween. One of the problems in every constant velocity joint of the ball type is maintaining the ball orbit in a single plane which bisects the angle of the adjoining members. Many prior art structures have provided various means to position the plane of the ball orbit, such as a driver ball cage combined with means to position the cage. However, these prior art devices result in a high degree of friction which is undesirable in that it reduces the operating efficiency of the universal joint and shortens the useful life thereof. These problems have been solved by providing, in the preferred embodiments shown in my co-pending application, guide balls, which by engaging the driving balls, the inner race member, and the housing, position the plane of the ball orbit as required. The guide balls position the driver balls in such a manner that the axial forces therein are balanced, and the frictional resistance within the joint itself is of a relatively low degree.

The present invention relates to yet another problem pertaining to joint applications in motor vehicles and the like. When the angle between the axes of the driving and driven means, connected by a coupling, changes resulting in axial displacement or when the driving means and driven means vary in their relative axial displacement for other reasons, the coupling therebetween must provide means to accommodate this variable length. In prior art couplings including a universal joint, this variation is usually accommodated in a slip arrangement separate from the universal joint, such as a splined stub shaft and a sleeve yoke assembly which are movable relative to each other. However, this assembly by its very nature has a high degree of friction therein which resists such variation when under a torque load. Another disadvantage is the plurality of parts involved, since the slip joint and universal joint are two separate structures.

Later prior art devices have provided for accommodating the variation in length within the universal joint itself. One such embodiment is shown in Patent No. 2,911,805 wherein the outer race of a ball type constant velocity joint is made in the form of a housing and the inner race is allowed to move axially thereto. However, the positioning means for retaining the balls within a bisecting plane has remained similar to the prior art positioning means and has retained the driving ball cage in combination with means for positioning the cage and the balls in the bisecting plane. These structures, therefore, retained the objectionable features of frictional resistance to angular displacement within the joint and, in addition, the positioning means result in frictional resistance to axial displacement.

Additionally, recent developments in the field of vehicle suspensions have dictated a need for another type of universal joint. An example of such a suspension is shown in Patent No. 2,968,358, wherein a swing type axle assembly is disclosed. Normally, a vehicle with a rear driving swing axle suspension displays a marked tendency to squat during acceleration and rise during braking due to weight transfer. The above patent solves this problem by providing means between the vehicle differential unit and the driving wheel which means result in an increase or decrease in the effective length of the drive axle in response to the torque transferred thereby. This suspension by its geometry makes use of this extension and reduction in effective length to induce inward or outward forces to substantially balance the downward or upward forces exerted on the suspension by the rear portion of the vehicle under the influence of acceleration and braking. This feature has been called anti-squat.

Recent prior art devices have provided means within the universal joint itself to provide this extension and reduction of the effective length of the drive axle. This is done by having the joint itself accommodate relative axial movement between its driving and driven members, and in addition by arranging the members of the joint so that axial urging between the joint members results in response to torque being transmitted thereby.

However, the above mentioned joint is not a constant velocity joint. Therefore, while it will function to provide an anti-squat feature in a proper vehicle suspension, it will not transfer torque at a constant rotative movement. Since it is highly desirable to have the driving wheels driven at a constant velocity, thereby having a uniform power flow from the differential to the drive wheels, the problem arises of providing a constant velocity joint for this type of suspension which will accommodate relative axial and angular movement between its drive and driven members and which also will impart an axial urging between the driving and driven members in response to torque transmitted thereby.

Therefore, it is an object of this invention to provide a constant velocity universal joint which in itself will accommodate both the relative angular and axial displacement between the driving and driven means.

Another object of this invention is to provide such a constant velocity universal joint in which this relative angular and axial displacement is accomplished with a very small amount of frictional resistance and with a balance of axial forces.

Yet another object of this invention is to provide such a universal joint which has improved means for positioning the torque transferring means or driver balls of the universal joint.

Still another object of this invention is to provide a constant velocity universal joint which when incorporated in a suitable independent rear wheel suspension will have an anti-squat effect.

A further object of this invention is to provide such a constant velocity universal joint in which the members thereof are urged relative to each other in a predetermined axial direction in response to the transfer of torque thereby.

Another further object of this invention is to provide such a universal joint with an improved sealing means.

It is a still further object of this invention to provide such a universal joint which is simple to construct, easy to assemble, yet inexpensive and durable.

Other and further objects of this invention will become apparent from the following detailed description taken in conjunction with the accompanying drawings in which:

FIG. 6 is an elevational view of one of the covers of the embodiment of FIG. 4, looking out from the inside of the joint and showing the position of the driver balls and pilot keys;

FIG. 7 is a longitudinal sectional view of a third embodiment of this invention taken along line 7—7 of FIG. 8; and FIG. 8 is a view of the inner and outer races of the joint shown in FIG. 7 in their operable position with the drive balls positioned in the complementary grooves.

Figure 1:
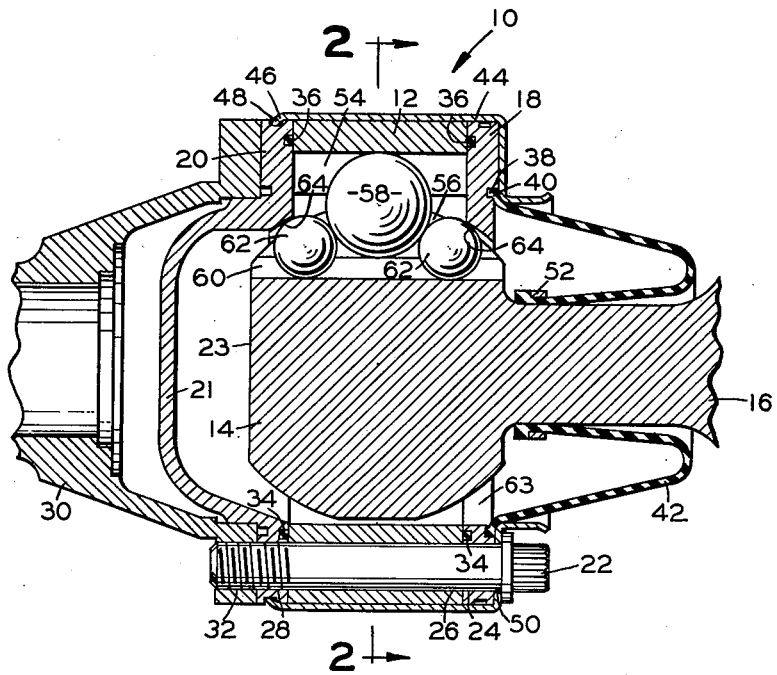
FIG. 1 is a longitudinal sectional view along the line 1—1 in FIG. 2 of a constant velocity ball type universal joint embodying this invention.

In one preferred embodiment of this invention, the universal joint is composed of an outer member or race having a plurality of angularly spaced receiving means in the form of axial grooves provided on the inner surface thereof. Disposed within the central axial opening provided in the outer member is an inner member or race which is provided with a like plurality of angularly spaced axial grooves on the periphery thereof and aligned with grooves in the outer race. The inner member is constructed so that it is free to move angularly and axially relative to the outer member. The outer member is fixedly attached to a flange shaft while the inner member is an integral enlarged part of a second shaft. Either the flange shaft or the second shaft may be the driving member while the other is the driven member. Interposed in driving relation between the inner and outer members are a plurality of driver balls, one in each pair of the aligned axial grooves. These balls provide the means whereby torque and motion are transferred between the inner and outer members while allowing the members to move axially and angularly relative to each other with relatively little friction. In the embodiments of the inventions as shown in the drawings, novel means, as described in my co-pending application, Serial No. 825,149, filed July 6, 1959 (now Patent Number 3,017,756), has been introduced to position the driving balls in a single plane which bisects the angle between the axes of the inner and outer members. This means comprises providing an axial pilot groove within each of the axial drive ball grooves in the inner member and locating separate pilot means therein in the form of pilot balls or a pilot key engaging sides of each drive ball. The pilot means by simultaneous engagement with the inner race, the drive ball, and a double curved cam surface provided on the outer housing, position the orbit of the drive balls in the bisecting plane. Since the inner member does not engage the outer member it is free to move axially relative thereto while being guided in this movement by the engagement with the pilot means and drive balls. By reversing the positioning of the pilot grooves, cam surfaces, and pilot means so that the pilot grooves and pilot means are within the outer race and the cam surfaces are on the inner race the joint will also operate in the same fashion. Also instead of having a single pilot key associated with each drive ball, the pilot key can be split transversely into two sections with the result that there is a separate pilot key on each axial side of the drive ball to position it.

In another preferred embodiment of this invention provision is made for an anti-squat feature. To accomplish this the drive ball grooves have been displaced from the axial straight position, such as helically. The grooves on the inner member are prepared as mirror images of the outer member grooves to place these complementary grooves in intersecting relationship. Since these grooves are disposed helically and intersect, as torque is transferred between the inner and outer members an axial force is created. The direction of the axial force on the members depends on the direction of the grooves in the inner and outer members and upon the direction of the torque load. This device, when disposed in the proper vehicle suspension, will provide an anti-squat axial force in proportion to the torque transmitted. The means for positioning the drive balls within the bisecting plane remains the same as in the preferred embodiment discussed hereinbefore.

Referring now to the drawings and more particularly to FIG. 1, a universal joint generally indicated at 10 includes an outer ball race or member 12 enclosing an inner ball race or member 14 which inner member is an integral and enlarged portion of shaft 16. A pair of cover members 18 and 20 are secured to opposite sides of the outer member 12 by means of a plurality of bolts 22 which extend through a plurality of cooperating holes 24 in cover 18, holes 26 in outer member 12 and holes 28 in cover 20.

Figure 3:
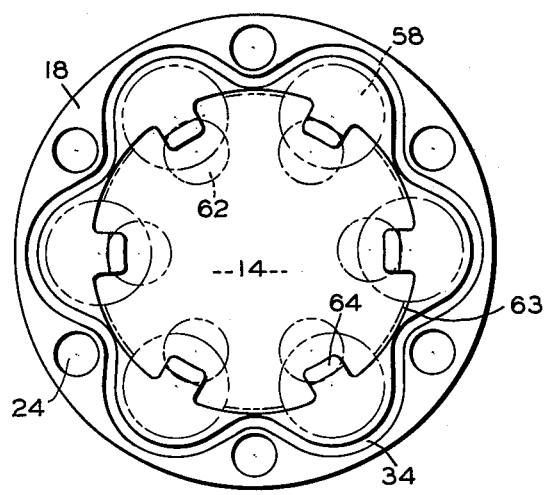
FIG. 3 is an elevational view of one of the covers, used in the joint shown in FIG. 1, looking out from the inside of the joint and showing the positions of the driver balls, pilot balls and inner race in phantom.

The covers 18 and 20 each have a groove 34 provided on their faces adjacent to the outer member 12 (see FIGS. 1 and 3). A seal 36 is received in each of the grooves 34 and engages the outer member 12 to prevent the escape of lubricant from the universal joint 10 between the member 12 and the covers 18 and 20. As is clearly shown in FIG. 3 the groove 34 is of an undulating nature. The groove passes on the inner side of each bolt hole 24 and then extends outwardly towards the circumference of the cover 18 and on the outward side of groove 54 to avoid engagement at this location with the drive ball groove 54, the drive ball 58, and pilot ball 62 which will be more fully described hereinafter.

The cover 20 completely encloses one end of the outer member 12. Cover 18 has an annular groove 38 on the outside face thereof to receive an annular lip 40 on a flexible boot 42. A flanged retaining ring 44 encloses the cover 18 and the outer member 12 and is provided with a lip 46 for engagement with a peripheral groove 48 in the cover 20. The ring 44 engages the boot 42 in the area of the lip 40 to maintain it in abutting engagement with the groove 38. The lip 46 by its engagement with the peripheral groove 48 in cover 20 will retain the ring 44 in position until the housing composed of covers 18 and 20 and member 12 is further assembled. The ring 44 is also secured to the housing by the bolts 22 passing through a plurality of holes 50 in the ring 44. The other end of the boot 42 is secured to the shaft 16 by a split pressure ring 52 in a well known manner. Thus, it is apparent that the entire universal joint 10 is sealed so that lubricant cannot escape and contaminants may not enter. Since the boot 42 is flexible, the members 12 and 16 are not restrained thereby when they move relative to each other.

Secured to the housing formed by the member 12 and covers 18 and 20 is a flanged shaft 30 having a plurality of threaded holes 32 into which bolts 22 are threadedly attached. The shaft 30 is attached to the housing on the side thereof covered by cover member 20. Either the shaft 30 or the shaft 16 may be the driving member and the other the driven member.

Figure 2:
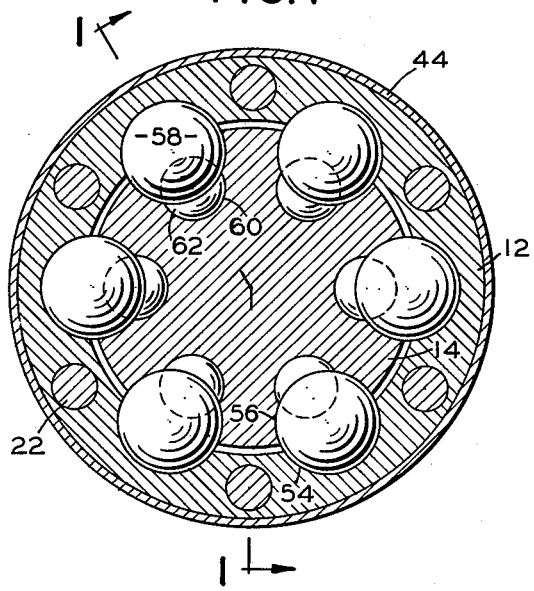
FIG. 2 is a partial cross sectional view of the universal joint shown in FIG. 1 taken along line 2—2.

As shown in FIGS. 1 and 2 the outer member 12 is provided with a plurality of angularly spaced axially extending receiving means in the form of drive ball grooves 54 which are substantially arcuate in cross section. The cross section of the grooves 54 in this preferred embodiment is a segment of a circle; however, other cross sectional configurations will be satisfactory such as segments of ellipses and the like. The inner member 14 is also provided with a plurality of angularly spaced axially extending receiving means in the form of drive ball grooves 56 in aligned, cooperating relationship with the drive ball grooves 54 in the outer member. Positioned within each aligned pair of drive ball grooves 54 and 56 is a drive ball 58 for transferring torque between the inner and outer members 14 and 12. A plurality of axially extending pilot ball grooves 60 are also provided in inner member 14, one being positioned in the bottom portion of each drive ball groove 56.

Received within each pilot ball groove 60 are two pilot balls 62, one on either axial side of each drive ball 58 contained in the corresponding drive ball groove 56. The pilot balls 62 engage the inner member 14 within the groove 60, the drive ball 58, and also a double curved concave cam surface 64 provided on covers 18 and 20 (see FIGS. 1 and 3). In this manner, the drive balls 58 are positioned by the pilot balls' 62 engagement with the cam surfaces 64 within a single plane which bisects the angle defined by the interesection of the axes of the outer member 12 and the inner member 14 as they move relative to each other. The well known outward urging forces on the pilot balls 62, induced by the action of the grooves 54 and 56 on the drive balls 58, are imposed upon and resisted by the cams 64 on the covers 18 and 20. As is obvious from FIGS. 1 and 2, and particularly FIG. 3, the inner member 14 does not engage the housing composed of covers 18 and 20 and outer member 12 and therefore may move axially relative thereto while guided and supported by balls 58 and 62.

The cover 18 has a central opening 63 provided therein through which the shaft 16 extends, which opening accommodates the axial and angular relative movement of the inner and outer members 14 and 12. Excessive angular displacement will be limited by the engagement of the shaft 16 and the cover 18. The cover 20 has a concave portion 21 which encloses one end of the outer member 12. The concave portion 21 not only encloses the outer race 12 thereby preventing the escape of lubricant in that direction, but also serves as a means to limit relative axial movement between the inner and outer members 14 and 12 in the inner direction by abuttingly engaging the end 23 of the inner race 14. Relative axial movement between the members in an outward direction is not limited within the universal joint 10 itself, but rather must be limited by the assembly (not shown) within which the universal joint 10 is accommodated.

It is understood that the pilot ball groove 60 can be positioned in the outer member 12 and the double curved cam surface 64 on the inner member 14. Thus, the pilot ball 62 would then engage the outer race, the drive ball 58, and the curved cam surface 64 on the inner race.

Figure 4:
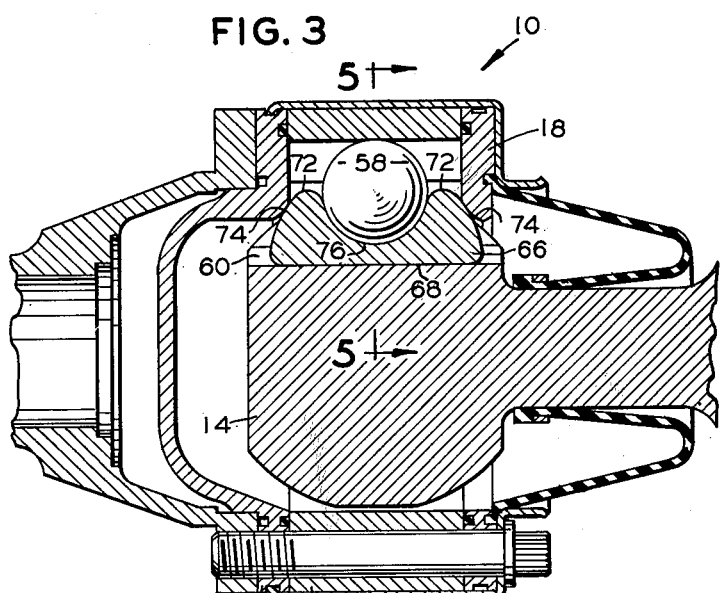
FIG. 4 is a longitudinal sectional view of another embodiment of this invention taken along the line 4—4 in FIG. 5.
Figure 5:
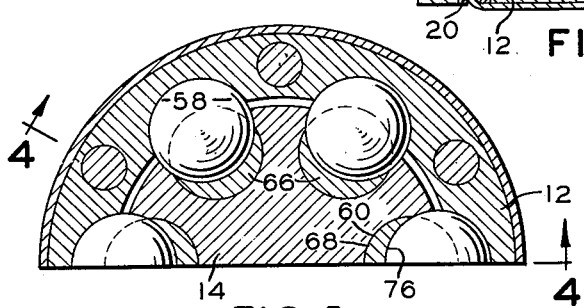
FIG. 5 is a partial cross sectional view of the universal joint shown in FIG. 4 taken along line 5—5.

Another embodiment of the invention is shown in FIGS. 4, 5 and 6 wherein the pair of pilot balls 62 surrounding each drive ball 58 as shown in the embodiment of FIG. 1 have been replaced by a pilot key 66. The base of the pilot key 66 is provided with a portion 68 which engages the pilot grooves 60 of the inner member 14. As shown, the pilot groove 60 and portion 68 are arcuate, however, other configurations may be used with satisfactory results. The portion of the pilot key 66 which projects from the inner member 14 is provided with a pair of arcuate surfaces 72 which slidingly engage the double curved convex cam surfaces 74 on the covers 18 and 20. The central portions of pilot keys 66 are provided with a truncated spherical depression 76 which is prepared to conform to the drive ball 58 engaged thereby. The pilot keys 66 by engaging the inner race 14, the double curved convex cam surface 74 on the covers 18 and 20 and the drive balls 58 position the drive balls 58 in a single plane which bisects the angle between the inner and outer members 14 and 12. As in the first embodiment, outward urging forces on the keys 66 is imposed upon and resisted by the cams 74 on the covers 18 and 20 and the inner member 14 does not engage the outer member 12 and therefore may move axially and angularly relative thereto while being guided and supported by the drive balls 58 and the pilot keys 66.

The pilot keys 66 as illustrated in this embodiment are preferably in one piece and extend to contact the drive balls 58 around approximately one-half their diameter as shown in FIGS. 4 and 5. However, each pilot key 66 may be divided into two portions, one on each axial side of the drive ball 58 and still operate in the same manner as the one piece key 66.

Referring now to the third embodiment of this invention shown in FIGS. 7 and 8, the above described pilot means have been utilized in a constant velocity universal joint with a groove configuration which will result in an anti-squat axial urging force in response to the imposition of torque thereto. The pilot means remain and operate the same as in the previous embodiments and therefore will not be described again. The grooves 78 in the outer member 12, while extending substantially axially, have been displaced helically, and as shown in FIG. 8 have a right-hand helix. The complementary, cooperating groove 80 in the inner member 14, while also being substantially axial are also displaced helically, and shown in FIG. 8 have a left-hand helix. The result of this groove displacement is that the outer and inner members 12 and 14 are provided with a plurality of complementary helical grooves, which are of equal and opposite helical displacement thereby being mirror images of each other and in intersecting relationship. Disposed in each pair of cooperating grooves 78, 80 is a drive ball 58. Since the drive ball grooves 78, 80 are disposed helically and in an intersecting relationship, upon the transfer of torque between the outer and inner members 12 and 14, an axial force is set up between the members which force tends to urge them axially relative to each other. As in the previous embodiments, and as shown clearly in FIG. 8, the inner and outer members 14 and 12 in no way engage each other and, therefore, are free to move both axially and angularly relative to each other in response to forces which arise both externally of the joint and forces which arise within the joint itself in response to the imposition of torque to the joint in conjunction with the helical displacement of the ball grooves.

It is now apparent from the foregoing that constant velocity universal joints have been described that will in themselves accommodate relative angular and axial displacement between a driving and driven means with relatively little frictional resistance and with a balance of axial forces therein; which joints can be constructed to result in an axial urging between the members thereof in response to input torque; that are integrally constructed, easy to assembly, and yet inexpensive and durable.

The preferred embodiments of this invention have been shown and described, but changes and modifications can be made and it is understood that this description is illustrative only and not for the purpose of rendering this invention limited to the details illustrated or described except insofar as they have been limited by the terms of the following claims.

What is claimed is:

1. A constant velocity universal joint comprising an outer member having an axial opening therein, an inner member received within said axial opening, said outer member having a plurality of receiving means within the axial opening thereof, said receiving means having at least an axial component, said inner member having a plurality of receiving means on the periphery thereof co-operable with said plurality of receiving means in said outer member, said inner member receiving means having at least an axial component, a plurality of torque transferring means with at least one positioned within each of said co-operable receiving means, and separate positioning means independently movable relative to each other and being associated with each of said torque transferring means and constantly positioning said torque transferring means in a single plane, said inner and outer members being relatively movable both axially and angularly whereby said inner and outer races may transfer torque at a constant velocity during relative angular and axial movement therebetween.

2. A constant velocity universal joint comprising an outer ball race having an axial opening, an inner ball race positioned within the axial opening of said outer ball race, a plurality of torque transferring means positioned between said inner and outer ball races for transferring torque therebetween, and separate pilot means independently movable relative to each other and being operably associated with each of said torque transferring means and positioning the same within a single plane always bisecting the angle between the inner ball race and outer ball race, said inner and outer ball races being relatively movable both axially and angularly whereby said inner and outer races may transfer torque at a constant velocity during relative angular and axial movement therebetween.

3. A constant velocity universal joint comprising a housing having an axially disposed opening therein and having a plurality of grooves provided in the inner surface thereof, said grooves having at least an axial component, an inner race received within said axial opening and spaced from said housing, said inner race having a plurality of grooves co-operable with said plurality of grooves in said housing, driver balls positioned within said co-operable grooves in said housing and said race for transmitting torque therebetween, and separate pilot means independently movable relative to each other and being operably associated with each driver ball positioning the driver balls within a single plane always bisecting the angle between the housing and the inner race, said inner race and said housing being relatively movable both axially and angularly whereby said inner race and said housing transfer torque at a constant velocity during relative angular and axial movement therebetween.

4. A constant velocity universal joint according to claim 3 wherein the separate pilot means comprise a pilot element on either side of the associated driver ball and in contact therewith.

5. A constant velocity universal joint according to claim 3 wherein the separate pilot means comprise a separate pilot key associated with each driver ball and in contact therewith.

6. A constant velocity universal joint according to claim 4 in which the pilot elements are pilot balls.

7. A constant velocity universal joint for transmitting torque between two members whose axes intersect at an angle comprising a housing having an axial opening therein, said housing being provided with a plurality of internal angularly spaced substantially axial grooves, an inner race received within the axial opening of said housing, said inner race being provided with a plurality of angularly spaced substantially axial grooves aligned with the plurality of grooves in said housing, driver balls positioned in said aligned grooves in said inner race and said housing for transmitting torque therebetween, and separate pilot means operably associated with each of said driver balls and engaging said housing and said inner ball race for positioning said driver balls during operation of the universal joint, said inner race and said housing being relatively movable both axially and angularly whereby said inner race and said housing transfer torque at a constant velocity during relative angular and axial movement therebetween.

8. A ball type universal joint comprising an inner ball race having a plurality of substantially axial grooves of arcuate cross section spaced angularly around the radial outer surface thereof, an outer ball race operably associated with said inner ball race and having a plurality of substantially axial grooves of arcuate cross section spaced angularly around the radial inner surface thereof and aligned with said plurality of grooves in said inner race, drive balls positioned in said aligned grooves between said inner and outer ball races for transmitting torque therebetween, a pair of covers secured to opposite sides of said outer ball race forming a housing therewith for said inner ball race, said inner ball race being axially and angularly movable relative to said outer ball race, and pilot means positioned within said plurality of grooves in said inner race and operably associated with said covers and inner ball race and said drive balls for positioning said drive balls in a bisecting plane during relative angular and axial movement between said inner and outer races.

9. A ball type universal joint comprising an inner ball race having a first plurality of substantially axial grooves of arcuate cross section spaced angularly around the radial outer surface thereof and a second plurality of axial grooves located one within each of the first axial grooves, an outer ball race operably associated with said inner ball race and having a plurality of substantially axial grooves of arcuate cross section spaced angularly around the radial inner surface thereof aligned with the first grooves in said inner ball race, a drive ball positioned in each of said aligned grooves between said inner and outer ball races for transferring torque therebetween, a pair of covers secured to opposite sides of the outer ball race forming a housing therewith for said inner ball race, said inner ball race being axially and angularly movable relative to said outer ball race, and separate pilot means positioned within each of the second plurality of grooves in said inner race and operably associated with said covers, said inner ball race and said drive balls for positioning said drive balls in a plane bisecting the angle between the axes of the inner and outer races during relative angular and axial movement therebetween.

10. A ball type universal joint according to claim 9 wherein the said separate pilot means comprise pilot balls.

11. A ball type universal joint according to claim 9 wherein the said sparate pilot means comprises a pilot key.

12. A constant velocity universal joint comprising an inner ball race, an outer ball race operably associated with said inner ball race, a plurality of torque transferring means positioned between said inner and outer ball races for transferring torque therebetween, separate pilot means independently movable relative to each other and being operably associated with each of said torque transferring means positioning said torque transferring means in a single plane always bisecting the angle between said inner and outer ball races during operation of said universal joint, said inner and outer ball races being movable relative to each other both angularly and axially whereby said inner and outer races transfer torque at a constant velocity during relative angular and axial movement therebetween.

13. A constant velocity universal joint comprising a first member having an axial opening therein, a second member received in the axial opening of said first member and spaced therefrom, said first and second members being both axially and angularly movable relative to each other and having separate cooperating receiving means, a plurality of torque transferring means positioned in said receiving means for transferring torque between said first and second members, and separate pilot means independently movable relative to each other and being associated with each of said torque transferring means, said receiving means having an axis with both axial and transverse components, whereby said first and second members will be urged axially relative to one another upon the application of torque to the universal joint.

14. A constant velocity universal joint comprising a first member having an axial opening therein, a second member received in the axial opening of said first member and movable both axially and angularly relative thereto, and a plurality of torque transferring means positioned between and engaging said first and second members to transfer torque therebetween, said first and second members having separate means for receiving said torque transferring means, said receiving means each having an axis with both axial and transverse components with the axis of said receiving means in said second member being disposed in the same manner relative to the axis of said second member as said first receiving means is to the axis of said first member but in the opposite direction, and separate positioning means independently movable relative to each other and being associated with each of said torque transferring means maintaining them in a single plane, whereby said first and second members are urged axially relative to each other upon the transfer of torque therebetween.

15. A constant velocity universal joint comprising an outer member having an axial opening therein, an inner member received in the axial opening of said outer member and movable both axially and angularly relative thereto, a plurality of balls positioned between and engaging said inner and outer members, and separate positioning means independently movable relative to each other and being associated with each of said balls, said inner and outer members having separate means for receiving said balls so that torque is transferred between said members, and said receiving means each having an axis with both axial and transverse components with the axis of said receiving means of said second member being disposed in the same manner relative to the axis of said second member as said first receiving means is to the axis of said first member but in the opposite direction whereby said first and second members are urged axially relative to each other upon the transfer of torque therebetween.

16. A constant velocity universal joint comprising an outer member having an axial opening therein and a plurality of helical grooves provided in the inner surface thereof, an inner member received within the axial opening of said outer member and movable both axially and angularly relative thereto, said inner member having a plurality of helical grooves with the same helix angle as, but opposite in direction to, the plurality of helical grooves in said outer member, a plurality of drive balls received by the helical grooves to transfer torque between said inner and outer members, and separate positioning means independently movable relative to each other and being associated with each of said torque transferring means whereby said torque transferring means are positioned within a single plane bisecting the angle between the axes of the inner and outer members during relative axial and angular movement thereof.

17. A ball type universal joint comprising an inner member having a plurality of grooves spaced angularly around the radial outer surface thereof, an outer member movingly associated with said inner member and having a plurality of grooves spaced angularly around the radial inner surface thereof in cooperating relationship with said plurality of grooves in said inner member, drive balls positioned in said cooperating grooves between said inner and outer members for transmitting torque therebetween, a pair of covers secured to opposite sides of said outer member forming a housing therewith for said inner member, sealing means disposed between said covers and said outer member, and separate pilot means positioned within each of said plurality of grooves in said inner member and operably associated with said covers, said inner member and said driver balls for positioning said driver balls in a bisecting plane during relative angular and axial movement between said inner and outer members.

18. A universal joint according to claim 16 wherein said positioning means comprises a separate independently movable pilot means associated with each drive ball and in contact therewith.

19. A universal joint according to claim 16 wherein said positioning means comprise a pilot ball on either side of said associated drive ball and in contact therewith.

20. A constant velocity universal joint for transmitting torque between two members whose axes are adapted to intersect at an angle comprising, a housing having an axial opening therein, said housing being provided with a plurality of internal angularly spaced grooves having at least an axial component, an inner race received within the axial opening of said housing, said inner race being provided with a pluarlity of angularly spaced grooves having at least an axial component and cooperable with the plurality of grooves in said housing, driver balls positioned in said cooperable grooves in said inner race and said housing for transmitting torque therebetween, and separate pilot means operably associated with each of said driver balls and engaging said housing and said inner race and operable to position said driver balls in a plane bisecting the angle between the axes of said members during operation of the universal joint, said inner race and said housing being relatively movable both axially and angularly whereby said inner race and said housing transfer torque at a constant velocity during relative angular and axial movement therebetween.

21. In a constant velocity universal joint the combination comprising, an outer member having an end face and an axial opening therein, said outer member having a plurality of angularly spaced groove means within the axial opening thereof, a plurality of fastener receiving means on the end face of said member spaced between some of said groove means, a cover means having an end face disposed in adjacent relationship with the end face of said outer member and having a plurality of fastener receiving means aligned with said fastener receiving means on said outer member, an inner race movably received in the opening of said outer member and having a plurality of angularly spaced groove means cooperating with the groove means in said outer member, a plurality of torque transmitting means with one positioned in each pair of cooperating groove means, means for positioning said torque transmitting means in a plane bisecting angle between the inner race and said outer member, said positioning means engaging said inner race said torque transmitting means and said cover means and being positioned by engaging said cover means thereby exerting an axial force thereon, one of said members having a sealing means receiving groove in the end face thereof, said groove defining an undulating path lying inwardly of said fastener receiving means and outwardly of said groove means, and a sealing means positioned in said receiving groove in said one member and engaging said other member and compressed therebetween, and a plurality of fastening means positioned in both said fastener receiving means for securing said cover member to said outer member thereby compressing said sealing means, whereby said members are sealingly connected and axial forces on said cover member by said pilot means do not induce leaking of said sealing means.

References Cited in the file of this patent

UNITED STATES PATENTS

| | | |
|---|---|---|
| 1,376,437 | Hood | May 3, 1921 |
| 2,182,455 | Smith | Dec. 5, 1939 |
| 2,309,939 | Dodge | Feb. 2, 1943 |
| 2,313,279 | Suczek | Mar. 9, 1943 |
| 2,323,569 | Rzeppa | July 6, 1943 |
| 2,453,964 | Betz | Nov. 16, 1948 |
| 2,615,317 | Rzeppa | Oct. 28, 1952 |
| 2,618,942 | Dodge | Nov. 25, 1952 |